(12) United States Patent  (10) Patent No.:  US 7,302,990 B2
Bunker et al.  (45) Date of Patent:  Dec. 4, 2007

(54) METHOD OF FORMING CONCAVITIES IN THE SURFACE OF A METAL COMPONENT, AND RELATED PROCESSES AND ARTICLES

(75) Inventors: Ronald Scott Bunker, Niskayuna, NY (US); Canan Uslu Hardwicke, Niskayuna, NY (US); Ching-Pang Lee, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 207 days.

(21) Appl. No.: 10/841,366

(22) Filed: May 6, 2004

(65) Prior Publication Data

US 2007/0235157 A1  Oct. 11, 2007

(51) Int. Cl.
 *B22C 9/00* (2006.01)
(52) U.S. Cl. .................. 164/28; 164/30; 164/45; 164/47; 164/138; 164/516
(58) Field of Classification Search .......... 164/28, 164/30, 45, 47, 138, 516
 See application file for complete search history.

(56) References Cited

U.S. PATENT DOCUMENTS

| | | | |
|---|---|---|---|
| 3,654,984 A | | 4/1972 | Mellen, Jr. et al. |
| 4,097,292 A | | 6/1978 | Huseby et al. |
| 4,141,781 A | | 2/1979 | Greskovich et al. |
| 4,561,491 A | * | 12/1985 | Slack ............... 164/516 |
| 5,014,763 A | | 5/1991 | Frank |
| 5,060,116 A | | 10/1991 | Grobman et al. |
| 5,154,945 A | | 10/1992 | Baldwin et al. |
| 5,250,136 A | * | 10/1993 | O'Connor ............. 156/272.2 |
| 5,690,472 A | | 11/1997 | Lee |
| 5,985,368 A | | 11/1999 | Sangeeta et al. |

(Continued)

FOREIGN PATENT DOCUMENTS

JP  2001164901 A  6/2001

OTHER PUBLICATIONS

U.S. Appl. No. 10/611,745, filed Jun. 30, 2003, Entitled "Component and Turbine Assembly With Film Cooling", by Ronald S. Bunker, et al.

(Continued)

*Primary Examiner*—Kevin Kerns
*Assistant Examiner*—I.-H. Lin
(74) *Attorney, Agent, or Firm*—Francis T. Coppa; Patrick K. Patnode

(57) ABSTRACT

A method of forming at least one concavity of a selected size and shape within a surface of an internal passageway of a metallic component comprises: depositing a ceramic-based material by a direct-write technique onto a ceramic core which is suitable for forming the internal passageway during a casting process to form the metallic component, wherein the ceramic-based material is deposited as a positive feature; heat-treating the deposited ceramic-based material; forming the metallic component by a casting process in which the ceramic core is incorporated into the casting, in a position selected as a desired position for the internal passageway; and then removing the ceramic core from the metal component after the casting process is complete, thereby forming the internal passageway, with the concavity contained within the surface of the passageway, said concavity formed by removal of the positive feature of the ceramic-based material.

9 Claims, 6 Drawing Sheets

U.S. PATENT DOCUMENTS

| | | |
|---|---|---|
| 6,025,036 A | 2/2000 | McGill et al. |
| 6,255,000 B1 * | 7/2001 | O'Connor et al. .......... 428/586 |
| 6,268,584 B1 | 7/2001 | Keicher et al. |
| 6,504,274 B2 | 1/2003 | Bunker et al. |
| 6,505,673 B1 * | 1/2003 | Abuaf et al. .................. 164/45 |
| 6,576,861 B2 | 6/2003 | Sampath et al. |
| 6,588,484 B1 * | 7/2003 | Fosaaen et al. ............... 164/28 |
| 6,589,600 B1 * | 7/2003 | Hasz et al. ................. 427/264 |
| 6,613,445 B2 | 9/2003 | Sangeeta et al. |
| 6,636,676 B1 | 10/2003 | Renn |
| 6,644,921 B2 | 11/2003 | Bunker et al. |
| 6,660,343 B2 | 12/2003 | McGill et al. |
| 6,660,680 B1 | 12/2003 | Hampden-Smith et al. |
| 6,887,528 B2 * | 5/2005 | Lau et al. ................... 427/448 |
| 6,921,014 B2 * | 7/2005 | Hasz et al. ............... 228/122.1 |
| 2003/0148539 A1 * | 8/2003 | van Dam et al. |

OTHER PUBLICATIONS

U.S. Appl. No. 10/622,063, filed Jul. 17, 2003, Entitled "Robotic Pen" by Stephen F. Rutkowski, et al.

U.S. Appl. No. 10/326,618, filed Dec. 23, 2002, Entitled "Method and Composition to Repair and Build Structures", by C.U. Hardwicke, et al.

* cited by examiner

METHOD OF FORMING CONCAVITIES IN THE SURFACE OF A METAL COMPONENT, AND RELATED PROCESSES AND ARTICLES

TECHNICAL FIELD

This invention generally relates to metal components used in a high-temperature environment. More particularly, the invention is directed to the formation of concavities in hot gas path components for turbine assemblies.

BACKGROUND OF THE INVENTION

Various types of metal components are used in high-temperature environments. Turbine engine parts represent examples of these types of components. The parts are usually made by an investment casting process.

Peak temperatures present along the hot gas path of a turbine engine are often maintained as high as possible for operating efficiency. Turbine blades and other elements of the engine are usually made of metal alloys (e.g., superalloys) which can resist the high-temperature environment. The superalloys usually have an operating temperature limit of about 1000° C.-1150° C. Operation above these temperatures may cause the various turbine elements to fail and damage the engine.

The hot gas path components of turbines typically employ a variety of internal passages, through which a cooling fluid (such as air) is passed. The use of the cooling fluid maintains the bulk temperature of the component at an acceptable temperature level. U.S. Pat. No. 6,644,921 (Bunker et al) discusses the use of cooling passages in various components, such as turbine blades. U.S. Pat. No. 5,690,472 (Lee) describes an internal mesh cooling hole arrangement for a turbine airfoil.

Many different types of cooling passages can be used in a variety of situations. These types of internal passages are usually formed by incorporating ceramic cores during the investment casting process. Removal of the core from the final casting results in the desired hollow passage—often a complex, precisely-defined interior flow network for coolant fluid.

Very often, the cooling passages contain surface features which greatly enhance cooling effectiveness for the component. For example, the passages may contain turbulation. The referenced patent to Bunker et al mentions the use of such turbulation in the form of transverse rib rougheners. The resulting increase in cooling effectiveness ultimately decreases the operating temperature of the turbine component.

Turbulation can be very effective for enhancing cooling effectiveness along a hot gas path. However, in some situations, there are drawbacks associated with this type of feature. For example, the use of turbulation on some regions of an airfoil surface may undesirably result in a significant pressure loss, due to the effects of friction.

Due in part to the occasional drawbacks of using turbulation, other types of surface features have attracted a great deal of interest. As described in U.S. Pat. No. 6,644,921, the use of various types of surface depressions or "concavities" in cooling passages can also improve the heat transfer characteristics for the component. In some instances, the bulk cooling fluid moves in a spiral motion over a selected pattern of concavities. The spiral motion serves to recirculate central coolant to the heat transfer surface. In this manner, the heat exchange process is more effective, when compared to a process in which turbulation is utilized.

Unfortunately, it can often be extremely difficult to form concavities within some of the interior regions of metal components. For example, there may be no practical method to form concavities in some regions of the interior flow network of a gas turbine blade. Moreover, forming a specific pattern of concavities of precise dimensions in those regions has often been impossible. The concavities are often too small to be cast, e.g., by the investment casting technique used to form the part. Attempts at casting the concavities may cause other problems as well, like premature die wear.

Techniques like electrochemical machining and electro-discharge machining (EDM) can sometimes be used to form concavities and other features on exposed surfaces of a substrate. However, these techniques cannot readily be used to form the features in enclosed, interior regions, because of the lack of easy access.

It should thus be apparent that new methods to form concavities in metal components would be welcome in the art. Particularly advantageous methods would be capable of forming the concavities within the interior regions of complex parts, e.g., complex, serpentine-cooled turbine blades; permit the formation of concavities having very specific dimensions, according to any desired pattern; and be generally compatible with other processes used to form the metal components parts, e.g., various casting techniques.

BRIEF DESCRIPTION OF THE INVENTION

One embodiment of this invention is directed to a method of modifying the surface of a ceramic core, comprising the step of depositing a ceramic-based material by a direct-write technique onto the core surface, according to a pre-selected pattern.

Another embodiment of this invention is directed to a method of forming at least one concavity of a selected size and shape within a surface of an internal passageway of a metallic component. The method includes the following steps:

(a) depositing a ceramic-based material by a direct-write technique onto a ceramic core which is suitable for forming the internal passageway during a casting process to form the metallic component, wherein the ceramic-based material is deposited as a positive feature in a shape which, as cured, is inverse to the shape of the concavity;

(b) heat-treating the ceramic-based material deposited in step (a);

(c) forming the metallic component by a casting process in which the ceramic core is incorporated into the casting, in a position selected as a desired location for the internal passageway; and then (d) removing the ceramic core from the metal component after the casting process is complete, thereby forming the internal passageway, with the concavity contained within the surface of the passageway, said concavity formed by removal of the positive feature of the ceramic-based material.

One benefit of this invention is it's capability of accurately forming concavities within intricate cooling passages of turbine engine components. Thus, components prepared by the processes described herein represent another embodiment of this invention.

Further details regarding the various features of this invention are found in the remainder of the specification, and in the accompanying drawings.

DETAILED DESCRIPTION OF THE INVENTION

Figure 1:
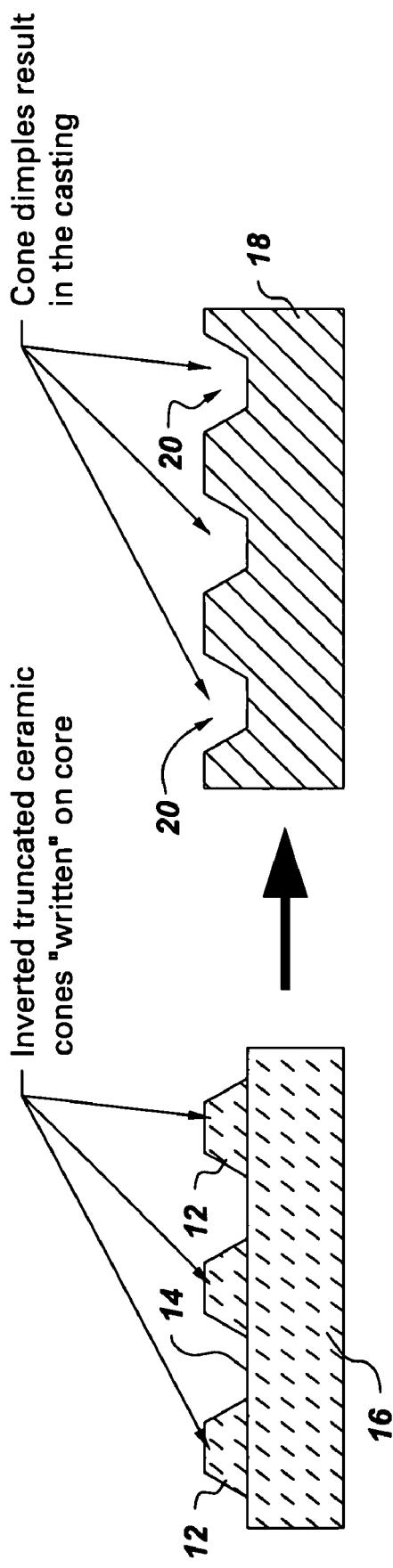
FIG. 1 is a cross-sectional illustration of ceramic cones deposited on the surface of a core, along with the corresponding concavities resulting from the use of that core during metal casting.

A variety of metallic components can be used in the present invention. Non-limiting examples of the metals are steel, aluminum, refractory metals such as titanium and niobium; and superalloys, such as those based on nickel, cobalt, or iron. The components are usually articles which are exposed to high temperature, and which require cooling. The components are also those which require some sort of internal passageway. As mentioned above, turbine engine airfoils are a prime example.

Ceramic cores which are used to form the internal passageway of a metallic component are well-known in the art. They are frequently used in the investment casting of directionally solidified eutectic and superalloy materials. Information related to investment casting, cores, and ceramic shell molds is widely available. Exemplary sources of useful information are as follows: "Kirk-Othmer Encyclopedia of Chemical Technology", 3rd Edition, Vol. 7, p. 798 et seq.; "Modern Metalworking", by J. R. Walker, The Goodheart-Willcox Co., Inc., 1965; and "Shell Molding and Shell Mold Castings", by T. C. Du Mond, Reinhold Publishing Corp., 1954.

Those skilled in the art are familiar with a variety of factors which influence the selection of core materials and processing conditions. In general, ceramic cores must remain physically and chemically stable at high casting temperatures. They also must be relatively non-reactive with the molten metal being cast to form the metal component. Moreover, the cores must be removable from the casting after the process is complete, e.g., by leaching processes which can be carried out in a commercially reasonable time.

Specific information related to cores and techniques for making them are also described in many references. Non-limiting examples include U.S. Pat. Nos. 5,014,763 (Frank); 4,141,781 (Greskovich et al); 4,097,292 (Huseby et al); and 3,654,984 (Mellen, Jr., et al), all of which are incorporated herein by reference. The ceramic-based material of which the core is usually made typically contains at least one constituent selected from the group consisting of alumina, alumina-aluminum; silica (e.g., fused silica), silicon carbide, silicon nitride, magnesium oxide; silicates (e.g., aluminum silicate and zirconium silicate); yttria; zirconia, and silica-zircon. As those skilled in the art are aware, a variety of binders may also be used in the formation of the core. Examples include ethyl silicate, colloidal alumina, sodium silicate, colloidal zirconium, and colloidal silica. The binders are often organic-based, e.g., polymerizable monomers such acrylamides, acrylates, and combinations thereof.

As those skilled in the art understand, the cores are sometimes made by injection molding or transfer molding techniques. In many instances, they are prepared from a ceramic slurry. As one non-limiting example, a core can be prepared from a ceramic slurry of a freezable liquid, a ceramic powder, and a gelling agent, as described in the referenced patent to Frank. The slurry composition can be introduced into a core-shaped mold cavity, and then subjected to freezing and gelling steps. The shaped, "green" body is then heated according to an appropriate temperature and time schedule, resulting in a sintered ceramic core.

As mentioned above, the ceramic core provides the internal, "hollow" regions of a metal component, when incorporated into a shell mold used for investment casting or a similar process. The positive (i.e., raised above the surface) features which are deposited on the core according to the present invention provide the desired concavities within those internal regions of the component. FIG. 1 describes this aspect of the invention in simple form. A ceramic material is deposited as a series of positives features 12 on the surface 14 of ceramic core 16. Cone-shapes are illustrated in the figure. After being deposited, the ceramic material is heat-treated as described below, to sinter the material and bond it securely to core surface 14.

The right side of FIG. 1 depicts a metal casting 18, resulting from the use of core 16 in the investment casting process. Removal of the core from the casting results in concavities 20. These concavities, ("dimples" in this instance) precisely replicate the pattern of positive features 12, in inverse form.

The ceramic material can be deposited as positive features in a wide variety of shapes and sizes, depending on the desired concavities which are inverse to such shapes. Non-limiting examples of the positive features include: diamonds, cones, hemispheres, hemispherical sections, circular pins, and combinations thereof. In the case of airfoils, it may sometimes be desirable to deposit some or all of the features in the shape of some sort of elongate hexahedron. Such a positive feature would serve to form a groove or channel with a substantially flat, rectangular bottom surface. As another example, a hemispherical section might resemble an elongate, semi-cylindrical shape, (e.g., a "Quonset hut"), which would ultimately form a groove with a rounded, bottom surface.

As mentioned above, a direct-write technique is used to deposit the ceramic material which forms the positive features onto the surface of the core. Direct-write techniques are known in the art and described in many references. Examples include U.S. Pat. No. 6,660,680 (Hampden-Smith), which is incorporated herein by reference. An instructive text is also available: "Direct-Write Technologies for Rapid Prototyping Applications", edited by A. Pique and D. B. Chrisey, Academic Press, 2002.

As used herein, a "direct-write" technique is a process in which a liquid, liquid suspension, or paste (higher material loading) is deposited onto a surface by ejecting the material through an orifice toward the surface, using a suitable direct-write tool. Usually, the tool itself does not make substantial contact with the surface. The direct-write tool is preferably controllable over an x-y grid relative to the printed surface (i.e., either or both the substrate and the device may move).

In general, the deposition materials for direct-write techniques can include a wide variety of metal, ceramic, or polymeric powders. In the present instance, the deposition material is a ceramic powder, usually similar or identical to the material forming the core. (Those materials were described in some detail above). The powder is uniformly distributed in a solvent, forming a slurry (often referred to as an "ink" in the jargon for direct-write processes). Various additives may also be present. For example, different types of surfactants can be added to impart suitable flow characteristics to the slurry. Moreover, binders such as starch or cellulose are also frequently used to enhance the integrity of the deposited material, prior to a subsequent heat treatment. The slurry can have a range of viscosities, e.g., from water to tar, depending on various factors. Those factors include the type of direct-write technique employed; and the types of features being formed, e.g., their size, shape, and required integrity. The slurry or ink is applied directly onto any type of substrate, in an automated technique. Usually, a CAD/CAM interface is employed to program a desired pattern for the deposition.

Many of the general details regarding slurry formation are known in the art and need not be described extensively here. Reference is made to various sources for ceramics processing, such as the "Kirk-Othmer Encyclopedia of Chemical Technology", 4th Edition, Vol. 5, pp. 610-613", and U.S. Pat. Nos. 6,613,445 and 5,985,368 (both to Sangeeta et al, and incorporated herein by reference). Moreover, the direct-write text mentioned above (Pique and Chrisey) describes many of the desirable characteristics for direct-write ink and paste formulations.

In brief, the slurry is preferably well-dispersed and free of air bubbles and foaming. It typically has a good rheological properties adjusted in accordance with the requirements for the particular direct-write technique to be employed. (For example, a ceramic slurry is often provided with the consistency of toothpaste when various pen techniques are used, as described below). Preferably, the solid particle settling rate in the slurry should be as low as possible. The slurry should also be chemically stable. Furthermore, when dry, the deposited ceramic material should retain its shape, and possess sufficient strength for subsequent steps, e.g., finishing and handling before firing.

A wide variety of additives can be present in the slurry, to provide the necessary characteristics. Non-limiting examples (in addition to the binders and surfactants mentioned above) include: thickening agents, dispersants, deflocculants, anti-settling agents, plasticizers, emollients, lubricants, surfactants and anti-foam agents. Those skilled in the art will be able to select the most appropriate level of any additive used, without undue experimentation. The slurry can be prepared by any conventional mixing technique. Non-limiting examples include the use of high-speed blenders, ribbon blenders, rotating canisters, and shear mixtures, e.g., a roll mill.

As alluded to previously, the direct-write techniques which can be used for this invention are known in the art. For example, the thermal spray techniques mentioned above are derived from conventional processes, as described in the Pique/Chrisey text (e.g., pp. 265-293). Non-limiting examples include high velocity oxy-fuel (HVOF) techniques, and plasma processes, such as vacuum plasma deposition (VPS). HVOF is a continuous combustion process in which the powder is injected into the jet stream of a spray gun at very high speeds. Those of ordinary skill in the art are familiar with various HVOF details, such as the selection of primary gasses, secondary gasses (if used), and cooling gasses; gas flow rates; power levels; coating particle size, and the like.

In a typical plasma process, a generic DC (direct current) thermal plasma torch is employed, providing a stable electric arc between a cathode and an annular, water-cooled copper anode. A plasma gas (often argon or another inert gas) is introduced at the back of the spray gun interior. The gas swirls in a vortex, and then exits out of the front of the anode nozzle. The electric arc from the cathode to the anode completes the electric circuit, forming an exiting plasma flame.

As those familiar with plasma spray technology understand, plasma temperatures can be very high, e.g., 15,000K for a conventional DC torch operating at 40 kW. The ceramic material being deposited on the substrate is supplied in powder form. The powder is introduced into the plasma flame. The powder particles are accelerated and melted in the flame, on a high-speed path to the substrate, where they impact and undergo rapid solidification. Those skilled in the art are familiar with variations in the general plasma spray process, and familiar with techniques for adapting the process to a variety of deposition materials. In the present instance, the plasma processes and other thermal spray techniques are modified to provide a computer-interface. Processes of this type are generally described, for example, in U.S. Pat. No. 6,576,861, which is incorporated herein by reference.

Another suitable direct-write technique is Laser Chemical Vapor Deposition (LCVD), also described in the Pique/Chrisey text. LCVD is a thermal technique for film growth. In brief, a laser is employed as an activator of a precursor for the ceramic that is photolyzed, pyrolyzed, or vibrationally/rotationally excited. The technique can be used to form complex structures on the substrate, by "mass-addition". The material deposition can be carried out under computerized motion control, as in other direct-write processes. U.S. Pat. Nos. 5,154,945 and 5,060,116 also discuss various aspects of LCVD, and are incorporated herein by reference.

Another very common direct-write process is based on ink-jet techniques. These techniques are described extensively in the Pique/Chrisey text (e.g., Chapter 7), and in many other references, e.g., the "Kirk-Othmer Encyclopedia of Chemical Technology", 4th Edition (1996), Vol. 20, pp. 112-119. Various ink jet systems can be employed, e.g., continuous mode systems and demand-mode (e.g., impulse) systems. Within the latter category, there are various types of impulse systems as well, e.g., piezoelectric systems and thermal impulse systems. The electronic control mechanisms for ink jet systems are also well-understood in the art. Various computer-control systems can be employed, e.g., using a CAD/CAM interface in which the desired pattern of deposition is programmed.

Those skilled in the art are familiar with the requirements for ink compositions, which can usually be aqueous or solvent-based. In addition to some of the additives mentioned above, ink jet compositions may contain other ingredients which are somewhat particular to this deposition method. For example, humectants and selected co-solvents may be use to inhibit drying of ink in the nozzles. The composition of the ceramic slurries used according to this disclosure can be readily adjusted to be compatible with ink jet deposition.

Yet another direct-write process which can be used for this invention is laser-guided direct writing (LGDW). In a typical process of this type, a stream of deposition particles is produced, as described in the Pique/Chrisey text (e.g., pp. 10 and 646-648). The particles are constrained by a laser beam, and directed onto a selected region of the substrate. The particles often originate as suspensions, e.g., a suspension in water. In some instances, ultrasonic atomization is used to spread the particles in the atmosphere, for contact with the laser beam.

Laser particle guidance systems and related details are also described in U.S. Pat. Nos. 6,636,676 and 6,268,584, which are incorporated herein by reference. As described in the latter patent, the laser particle guidance systems typically include various positioning mechanisms, which are computer-driven to direct the pattern of deposition. Some of the LGDW systems are commercially available from Optomec Design Company, Albuquerque, N. Mex.

The "MAPLE" technique is another example of a direct-write process suitable for the present invention. (The acronym corresponds to "matrix assisted pulsed laser evaporation"). The MAPLE technique is described in considerable detail in the Pique/Chrisey text (e.g., pp. 138-139; 521 et seq.). The technique is also described in U.S. Pat. Nos. 6,660,343 and 6,025,036, both incorporated herein by reference.

In brief, MAPLE uses a focused ultraviolet laser pulse to transfer material from a coating on a carrier, onto a substrate. In one type of MAPLE system, the laser impacts the material to be transferred from the back at the carrier-material interface, through the carrier (which is usually transparent). The material is designed to absorb the laser energy, causing local evaporation at the interface. Discrete "packets" of the deposition material are thus propelled toward the substrate, according to a computer-controlled pattern. By using a sequence of laser pulses while moving one or both of the carrier and the substrate, a desired pattern can be directly written.

Those skilled in the art will be able to adjust the characteristics (e.g., particle size and rheology) of the ceramic composition used herein, to be compatible with the MAPLE process. Various other process parameters can also be adjusted by those familiar with MAPLE. Examples of the parameters include incident beam energy, pulsed laser rate, and the like.

Pen-dispensing systems represent another class of direct-write techniques, and they are often preferred for the present invention. The systems often use automated syringes, and are sometimes generally referred to as "micropen printing" processes. The referenced Pique/Chrisey text provides a general description of these systems (e.g., chapter 8); they are also mentioned in the above-referenced Hampden-Smith patent. Some of the process factors mentioned above are relevant here as well, such as the rheology of the printing paste or ink, as well as its wetting and adhesion characteristics. Commercial pen-dispensing systems are available from various sources. For example, the Micropen™ tool is available from Ohmcraft, Inc., of Honeoye Falls, N.Y. The Dotliner™ dispense system is available from Manncorp, Huntingdon Valley, Pa.

Figure 2:
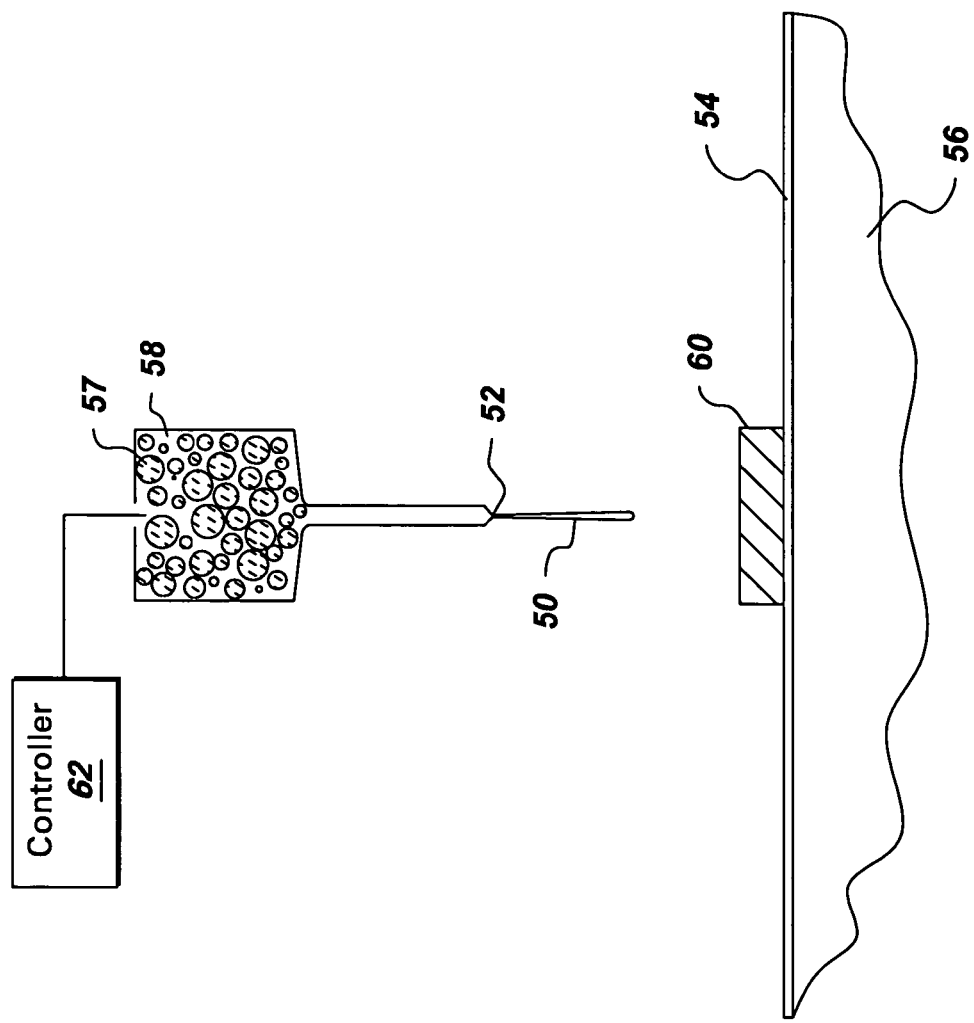
FIG. 2 is a general illustration of a direct-write pen system for applying positive features to the surface of a core.

One exemplary pen-type deposition process is described in a co-pending application for R. Bunker et al, Ser. No. 10/611,745 filed on Jun. 30, 2003, which is incorporated herein by reference. As shown here in FIG. 2, a mixture 50 of the deposition material is delivered through a nozzle or "pen" 52 onto surface 54 of core/workpiece 56. The mixture 50 is usually a ceramic slurry, comprising ceramic powder 57 dispersed in a liquid medium 58. (As mentioned above, the viscosity of the slurry is sometimes very high). Mixture 50 is forced through nozzle 52 at a controlled rate, to achieve a desired shape and size for positive feature 60. One or more passes with the pen may be made on the surface. The size of the orifice of the nozzle (along with other factors mentioned below) is selected to provide a desired dimension for each pass.

During deposition of the material, nozzle 52 is displaced relative to core surface 54, so as to form feature 60 with a pre-determined shape. (As alluded to above, the pre-determined shape is generated and stored in a computer e.g., as a CAD/CAM file). The "displacement" is carried out by moving the nozzle or the core surface, or moving both, with computer control. An exemplary controller is generally depicted as element 62. The height and shape of the features deposited on the core are determined in part by the flow-rate of the dispensed material stream, and the relative speed of movement between the pen tip and the workpiece during the writing operation.

In many instances, there may be a considerable curvature in the surface of the core, due in part to the complex internal region to be formed in the metal component. The pen processes described above can effectively deposit the desired ceramic material on most sections of these curved surfaces as well as any irregular surfaces. However, it is sometimes desirable to use other types of pen systems to efficiently deposit the desired material on many additional surface regions of the core.

One pen system for effectively applying deposition material to a core of complex 3D configuration and varying curvature is described in a co-pending application for S. Rutkowski et al, Ser. No. 10/622,063, filed on Jul. 17, 2003, which is incorporated herein by reference. The system, colloquially referred to as a "robotic pen", is computer controlled. It includes a multi-axis stage for mounting a workpiece (i.e., the core in this instance), and a cooperating elevator for providing vertical motion to the workpiece. Usually, the pen tip is rotatably mounted to the elevator. A dispenser for providing the deposition material is joined in flow communication to the pen tip. The dispenser ejects a stream of material to the surfaces of the workpiece as the workpiece moves relative to the pen.

Figure 3:
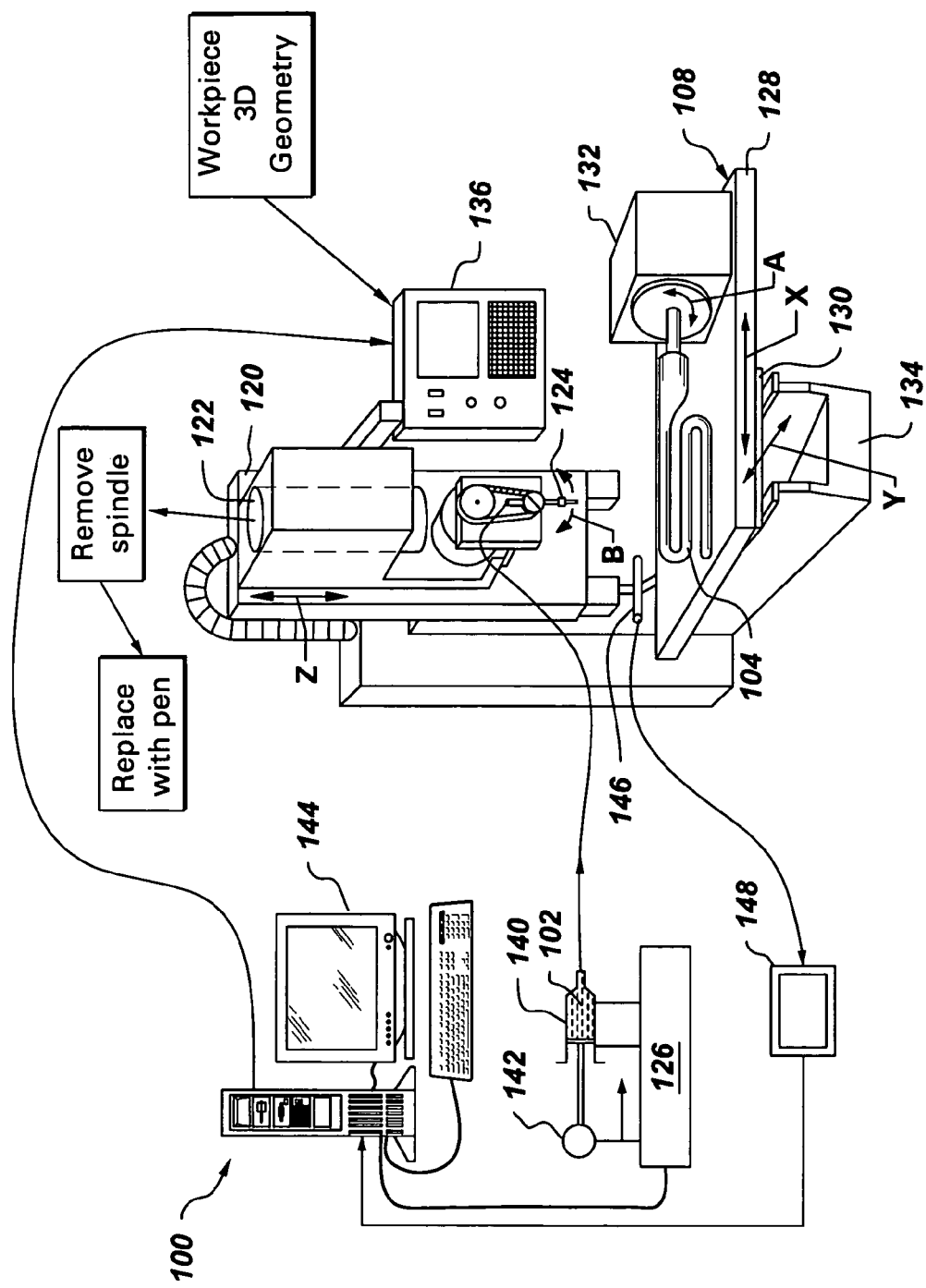
FIG. 3 is a schematic representation of a robotic, multi-axis pen system for direct-writing positive features on a core surface.

FIG. 3 provides a general description of the robotic pen system 100, which is configured for dispensing any suitable material 102 in a stream atop the surface of any suitable workpiece 104, i.e., the ceramic core. The core may have a simple, two-dimensional (2D) configuration such as a flat plate, yet more commonly will have a complex 3D configuration with varying curvature or change in contour along its three axes. The core may also include a variety of internal regions, e.g., cavities, holes, indentations, and the like. For the purpose of this description, the core is depicted as a relatively simple shape.

The robotic pen system illustrated in FIG. 3 is an assembly of primarily conventional components suitably modified in a collective apparatus or system for writing with precision on the various surfaces of the core. (As described in Ser. No. 10/622,063, such a system can be obtained by modifying a commercially-available milling machine, e.g., a complex multi-axis computer numerically controlled (CNC) machine.).

The pen system of FIG. 3 includes a three axis stage 108 for mounting core/workpiece 104 for two-axis (X,Y) precision translation and precision rotation (A) relative thereto. The system machine also includes conventional elevator 120, on which is mounted a conventional rotary spindle 122. The elevator introduces a vertical axis (Z) of translation relative to workpiece stage 108, with the three axes of translation (X,Y,Z) and one rotary axis (A). This type of multi-axis capability is typically used for performing milling operations for various 3D workpieces. However, in the robotic pen system, the rotary spindle is removed, and replaced with rotary pen tip/nozzle 124, which can be rotatably attached to elevator 120.

A conventional dispenser 126 (or similarly-functioning device) is suitably joined in flow-communication with pen tip 124, for ejecting material 102 (liquid, paste, or slurry) onto the surface 127 of the workpiece. (Material 102 may be in liquid, paste, or slurry form). As alluded to previously, the deposition of material 102 is carried out in a desired pattern, under the relative movement between the pen tip and the mounted workpiece.

As shown in FIG. 3, workpiece stage 108 may have any conventional configuration. As illustrated, the stage may include a first table 128 for translating the workpiece along a first linear axis X. A second table 130 can be attached on the underside of the first table 128, for translating the first table and workpiece 108 along a second linear axis Y. The second axis Y is orthogonal to the first axis Z for two-plane mounting, and for translation of the workpiece in a conventional manner. The pen system further includes a precision driven rotary spindle 132. This spindle can be suitably mounted to first table 128, for allowing precision-rotation of the workpiece along a first rotary axis A.

The pen tip 124 can be mounted in any suitable manner to the vertical elevator 120 for translation in a third linear axis Z. Axis Z is orthogonal to the X and Y axes. The pen tip can also be mounted to the elevator for rotation in a second rotary axis B. In this manner, full 360 degree movement of the pen is permitted, for reaching most external and internal regions of workpiece 104. Stage 108 and elevator 120 can be joined in a common structural frame 134, which permits relative movement between the pen tip and the workpiece.

The robotic pen system of FIG. 3 also includes a conventional, digitally-programmable computer or controller 136. As mentioned above, computer 136 is conventionally configured in software, for controlling all motion axes of the machine. This includes the relative movement of pen tip 124 and workpiece 104, as the deposition-material stream 102 is dispensed from the pen tip. In particular, computer/controller 136 is effective for controlling and coordinating relative movements along the three linear axes X,Y,Z and the two rotary axes A,B. The rotary axes permit accurate alignment and orientation of the pen tip on the varying 3D surface of the workpiece upon which the stream of deposition-material is written in the desired pattern. The computer/controller 136 may be configured in suitable software with the three-dimensional geometry or configuration 138 of the workpiece, and a corresponding predetermined path or pattern for the pen tip across the workpiece. Other details regarding computer-control of the pen and the deposition pattern are described in application Ser. No. 10/622,063 of Rutkowski et al. For example, the pen tip is usually maintained closely adjacent to, but not touching, the workpiece surface, leaving a suitable gap therebetween. In another example, a conventional charge coupled device (CCD) camera 146 is optionally mounted for visually observing the gap between the pen tip and the workpiece 104 during operation and is joined to a viewing monitor 48 which allows the machine operator to view the pen tip and gap for use in setting up the machine and controlling its operation. Usually, the pen tip is oriented substantially perpendicular to the workpiece surface.

Details regarding dispenser 126 and its operation are also provided in the Rutkowski et al patent application. The dispenser may have any conventional configuration, and usually includes a syringe 140 having a suitable reservoir for initially storing the desired writing material 102. The syringe is joined in flow-communication with the pen tip 124, by a flexible conduit, for example. The dispenser can also include means 142 for precision pumping of the syringe to dispense the deposition material through the conduit for ejection from pen tip 124. The dispenser can optionally be controlled by its own digital processor or controller, e.g., personal computer 144. As described in the Rutkowski et al application, precise control of the dispenser and the dispensed stream of material can help to ensure a precise height and width for the portions of deposited material.

Other details regarding the robotic pen system and its optional features are also described in Ser. No. 10/622,063, and do not require extensive discussion here. For example, a conventional open-loop control or closed loop feedback mechanism may be employed to maintain a specific gap between the pen tip and the workpiece surface. The feedback control can be implemented with the aid of various measurement devices, e.g., laser, sonic; and camera-controlled devices. Moreover, the pen tip may be as short or as long as is necessary for the workpiece being processed. Mechanisms for replacing the pen tip with tips of other configurations and lengths are also described by Rutkowski et al. The pen tip may be positioned for writing upon any internal surface of a hollow workpiece, i.e., a core with internal regions, as described previously.

After the deposition material has been applied to the surface of the core, a heat treatment is carried out to remove any volatile substances (e.g., binder, solvent, and the like), and to consolidate and strengthen the material. The deposited material can be heat-treated by itself or with the core. Exemplary heat treatments include focused energy sources such as plasma, laser, electron beam-heating; or heating with some other local source. Alternatively, the heat treatment can be carried out in a furnace if the temperature is low enough to avoid damage to the core. The heat treatment can be carried out at a pre-set, "firing" temperature, or according to any graduated schedule. Moreover, when the material has been deposited in more than one layer, heat treatments can be carried out between each deposition.

The heat treatment temperature and time will depend on various factors, such as the type of material deposited, and its dimensions, as well as the composition of the substrate. In the case of depositing typical ceramic materials like those described above (e.g., alumina- or alumina/silica-based), the heat treatment schedule is one sufficient to burn out the volatile components, while also promoting consolidation. The latter phenomenon is known to those skilled in the art, and usually involves inducing the ceramic powder grains or particles to undergo inter-particle sintering mechanisms which bond the grains or particles to one another, and to the substrate material. The heating temperature for ceramic materials is typically in the range of about 1500° C. to about 1550° C. However, this range may vary considerably, and may also include lower-temperature stages to primarily remove the volatile material.

In an alternative embodiment, the deposition material for the positive features could be written onto the core while the core is still in its unfired or "green" state. The core, with positive features applied thereto, could then be heat-treated in the usual manner. Moreover, the features could be written on different cores or core sections which are in the green state, and which are then attached to each other (by conventional techniques), prior to the heat-treatment. In another alternative embodiment, the heat treatment occurs during at least a portion of the deposition process. Such heat treatment can be accomplished, for example by having a laser or a fine plasma source following nozzle 52 and can occur either on a green core or on a previously heat-treated core.

As described previously, the core can be used in any conventional casting process for producing a metal component, with investment casting being a primary example. Use of the core itself produces many of the internal regions of the component. The positive features added to the core by this invention ultimately provide concavities which are incorporated into those internal regions. (Techniques for removing the core after casting are well-known in the art, and usually involve leaching processes with suitable solvents, as described in some of the patents referenced above).

Figure 4:
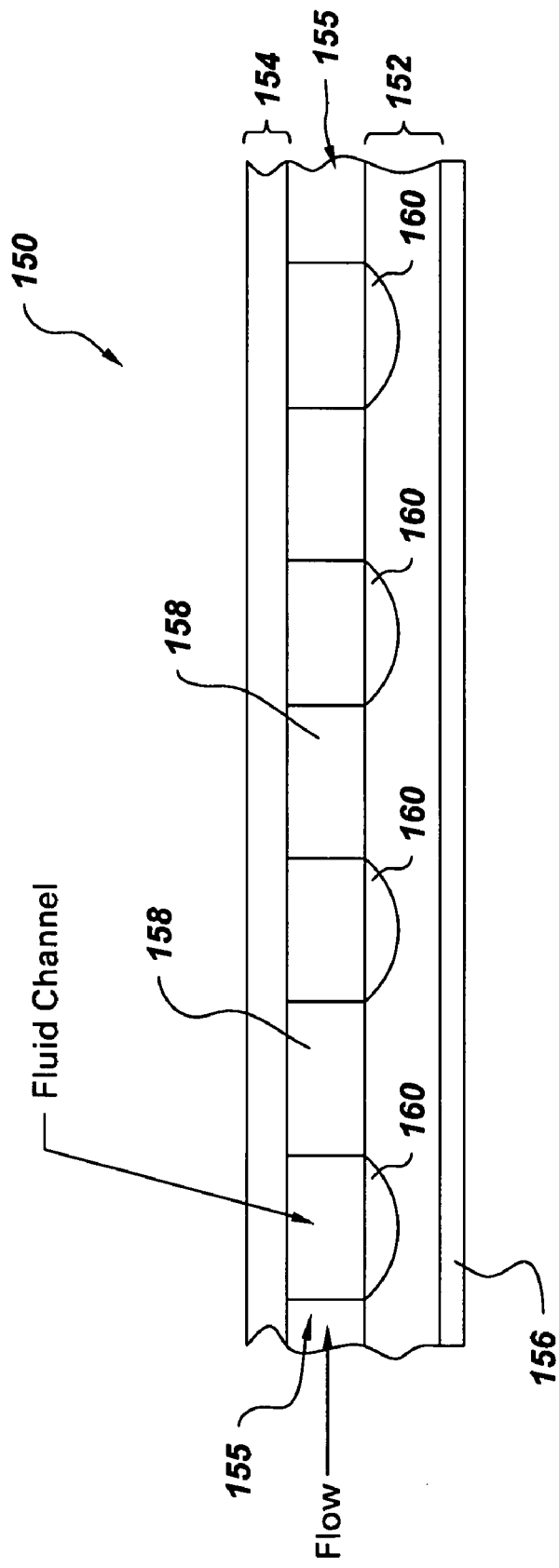
FIG. 4 is a cross-sectional illustration of a portion of a hollow airfoil, containing concavities interspersed in a mesh cooling hole arrangement.

FIG. 4 is an exemplary illustration of the incorporation of concavities into a turbine engine component. The component is typical of that prepared by an investment casting process, using ceramic cores modified according to the present invention. A cross-section of a portion of a hollow airfoil 150 is depicted in the figure. Opposite side walls 152 and 154 define a cooling network 155 in between them. Side wall 152 represents a higher-temperature or "hot" wall. The hot wall is typically exposed to combustion gas temperatures of at least about 1000° C., and more often, at least about 1400° C. In this depiction, the side wall 152 is covered by a protective thermal barrier coating 156 (TBC). Side wall 154 (the interior wall of the airfoil) is usually referred to as a "cool surface" or "cooler surface".

In a conventional airfoil of this type, the sidewalls are often joined together at an axially-upstream end along a leading edge, and at an opposite, axially-downstream end along a trailing edge (not shown here). Cooling air is conventionally bled from a compressor (also not shown), and then directed through cooling network 155, in the direction indicated by the flow arrow).

An internal mesh cooling arrangement is present in FIG. 4. As described in the above-mentioned patent to Lee (U.S. Pat. No. 5,690,472, incorporated herein by reference), the "mesh" is usually formed by intersecting cooling holes. In the present case, sets of cooling holes intersect to define spaced-apart, internal solid nodes 158. As explained in the Lee reference, the mesh arrangement results in more turbulent airflow between the airfoil side walls, which enhances heat transfer.

Concavities 160 have been formed between nodes 158 in a pre-selected pattern, according to the present invention, i.e., using the modified core. While the concavities are depicted as dimples in FIG. 4, they can be produced in practically any shape or size, as discussed previously. The concavities can further improve heat transfer characteristics in a mesh cooling system, by initiating and sustaining bulk fluid motion along the heat transfer surfaces. Moreover, the enhanced cooling can be accomplished without the drawbacks which sometimes accompany the use of turbulated features in this type of cooling system.

Figure 5:
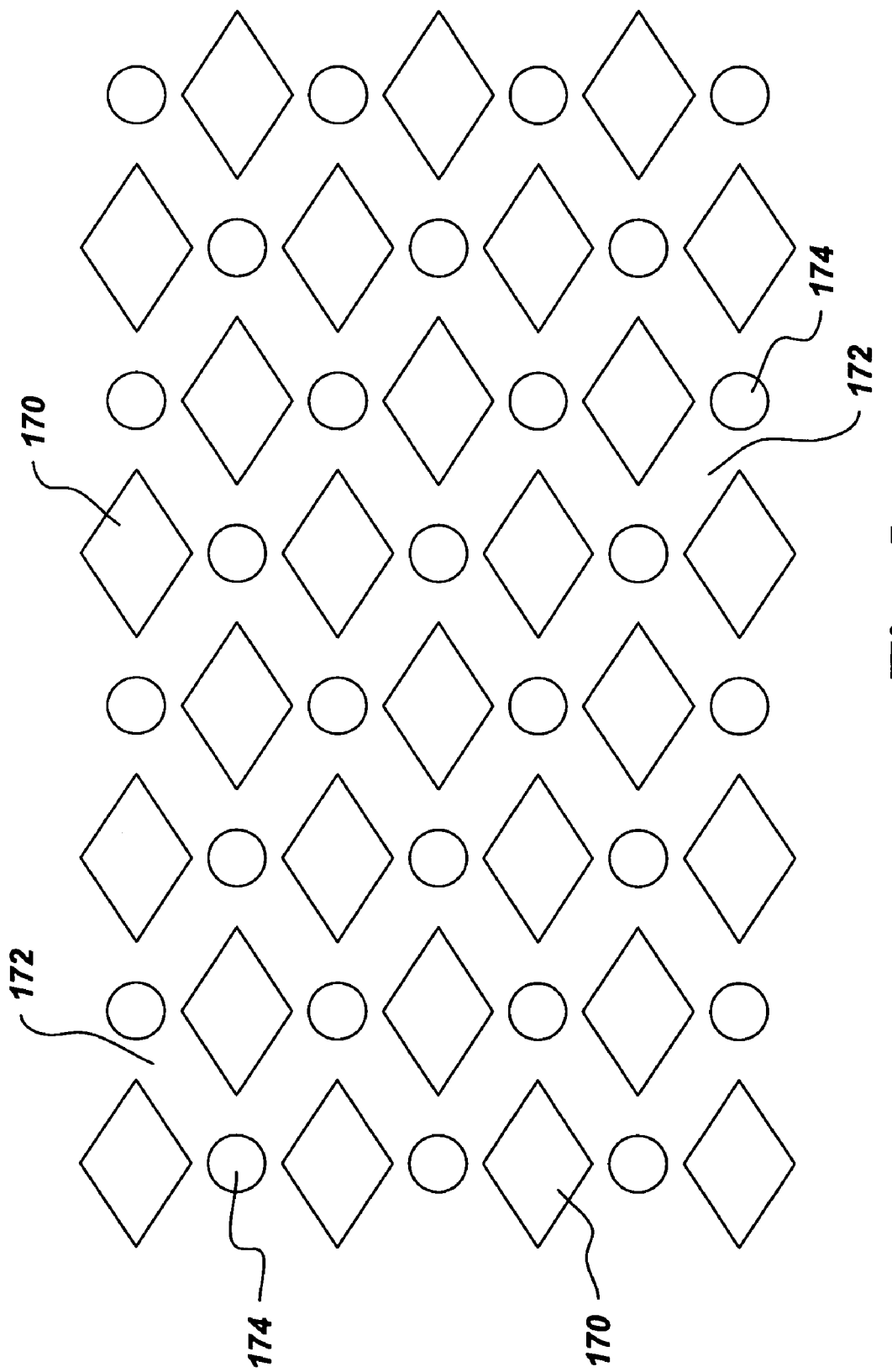
FIG. 5 is another illustration of concavities interspersed in a mesh cooling hole arrangement.

FIG. 5 is a simple representation of a typical mesh cooling arrangement in an internal section of a turbine airfoil, similar to that described above. The pattern of diamond-shaped mesh nodes 170 results in junction regions 172. Concavities or dimples 174 are formed in these junction regions by providing an inverse pattern of positive features on a core used to form the internal section during a casting process. The present process eliminates the need for masking steps and other surface-preparation steps that were often necessary in the past to provide features on airfoil surfaces. Moreover, the conventional techniques used previously were still generally incapable of providing a precise pattern of concavities in intricate cooling pathways, as can be accomplished by following the present teachings.

It should be emphasized, however, that the concavities formed according to this invention need not be incorporated into a mesh cooling arrangement. They can be formed on a wide variety of airfoil surfaces which may or may not have any other type of specific cooling feature. In fact, the concavities can be formed on the surface of any metal component made by a casting process.

EXAMPLES

The following example is provided for illustration, and should not be considered to be any type of limitation on the scope of the present invention.

A Micropen™ device (400 Series), from Ohmcraft, Inc., Honeoye Falls, N.Y.) was used in this example. The pen size was 10 mils (0.25 mm) outer diameter×7 mils (0.18 mm) inner diameter.

A section of electronic-grade alumina was used as the workpiece/substrate in this example. Its dimensions were about 2 inches×1⅜ inch (5.1 cm×3.5 cm), with a thickness of about 1 mm. The workpiece was positioned on a platform in the device which is movable along X and Y axes via computer-control. The workpiece was held in place by a vacuum.

The deposition material was alumina/magnesium oxide (10% by weight MgO, based on $Al_2O_3$ and MgO combined). It was prepared by dry-mixing powders of the two oxides, and then adding solvent (terpineol), with additional mixing. (The solvent included a small amount of cellulose binder). The amount of solvent added was sufficient to provide the mixture with a viscosity roughly equivalent to that of toothpaste. The composition was as follows:

82.9 g Heraeus terpineol
  4.4 g MgO particles (35 nm)
  0.34 g glycerin
  44 g TM-DAR alumina The deposition material was added to the dispenser on the device, which pumps the material to the pen upon command. The device was programmed to write according to a #46 cross-section pattern, i.e., a selected setting on the device. Direct-writing was then initiated. The pen speed across the sample of the workpiece was about 50 mils (1.27 mm) per second. During writing, the pen tip was maintained at a distance of less than about 10 mils (254 microns) from the workpiece surface, and substantially perpendicular thereto.

The writing was carried out in three passes to achieve the desired thickness. The average, air-dry time between passes was about 2 hours. The final, average height for the deposited cross-hatching (which defined the diamond pattern) was about 60 mils (1.52 mm).

Figure 6:
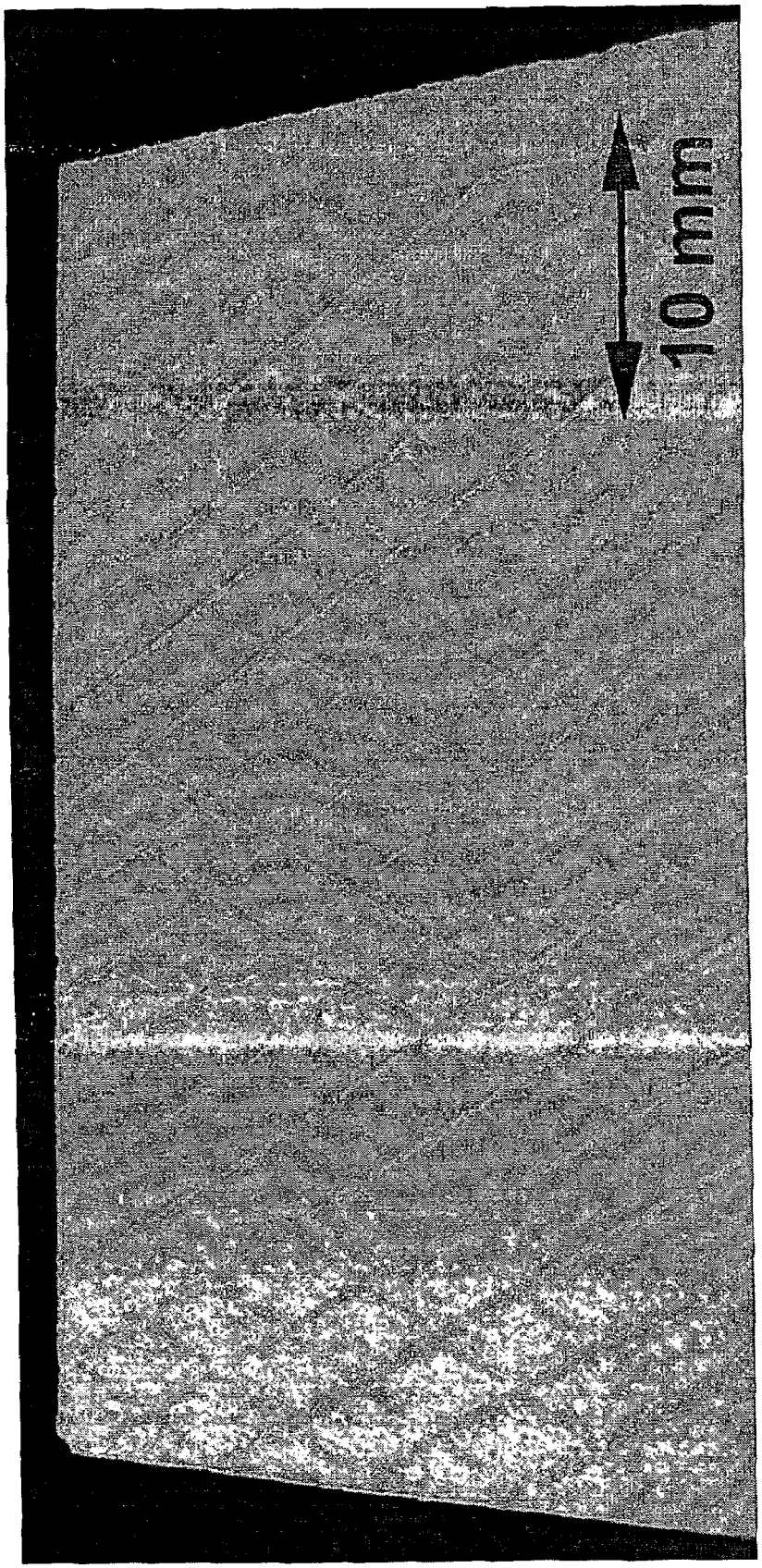
FIG. 6 is a photograph of a portion of a ceramic substrate, on which a pattern of ceramic features has been deposited.

FIG. 6 is a magnified photograph of the workpiece, after direct-writing was completed. It is clear from the photograph that the intersecting diagonal lines (i.e., the cross-hatching) were precisely written on the substrate. The substrate is meant to represent the surface of a core. After being heat-treated as described above, the diamond pattern was structurally integrated with the core surface. The core can then be used in a shell-making process to provide concavities which inversely replicate the diamond pattern.

This invention has been described according to specific embodiments and examples. However, various modifications, adaptations, and alternatives may occur to one skilled in the art without departing from the spirit and scope of the claimed inventive concept. All of the patents, articles, and texts which are mentioned above are incorporated herein by reference.

What is claimed is:

1. A method of forming at least one concavity of a selected size and shape within a surface of an internal passageway of a metallic component, comprising the following steps:
    (a) depositing a ceramic-based material by a direct-write technique onto a ceramic core which is suitable for forming the internal passageway during a casting process to form the metallic component, wherein the ceramic-based material is deposited as a positive feature in a shape which, as cured, is inverse to the shape of the concavity;
    (b) heat-treating the ceramic-based material deposited in step (a);
    (c) forming the metallic component by a casting process in which the ceramic core is incorporated into the casting, in a position selected as a desired position for the internal passageway; and then
    (d) removing the ceramic core from the metal component after the casting process is complete, thereby forming the internal passageway, with the concavity contained within the surface of the passageway, said concavity formed by removal of the positive feature of the ceramic-based material.

2. The method of claim 1, wherein the direct-write technique is selected from the group consisting of thermal spray, laser CVD, ink jet, laser particle guidance, matrix assisted pulsed laser evaporation (MAPLE), pen dispensing techniques, and combinations of any of the foregoing.

3. A method according to claim 1 for forming a pattern of concavities, corresponding to a pattern of ceramic-based material deposited as positive features in step (a).

4. The method of claim 3, wherein the positive features are in a shape selected from the group consisting of diamonds, cones, hemispheres, hemispherical sections, circular pins, elongate hexahedrons, elongate semi-cylinders, and combinations thereof.

5. The method of claim 1, wherein step (c) is carried out by an investment casting process.

6. The method of claim 1, wherein the ceramic-based material deposited in step (a) is heat-treated in step (b) under thermal conditions sufficient to sinter the material and bond it securely to the ceramic core.

7. The method of claim 1, wherein the ceramic core is in a green state during the deposition of the ceramic-based material in step (a).

8. The method of claim 7, wherein the ceramic core is heat-treated during step (b), with the ceramic-based material deposited thereon, under sintering conditions.

9. The method of claim 1, wherein the heat treating of step (b) occurs during at least a portion of the depositing of step (a).

* * * * *